(12) United States Patent
Durvasula et al.

(10) Patent No.: US 10,301,837 B2
(45) Date of Patent: May 28, 2019

(54) DRIVE MODULE FOR SUBMERSIBLE AUTONOMOUS VEHICLE

(71) Applicant: AQUA PRODUCTS, INC., Cedar Grove, NJ (US)

(72) Inventors: Kameshwar Durvasula, Garfield, NJ (US); Ethan Hanan, Teaneck, NJ (US); William Londono, Wayne, NJ (US)

(73) Assignee: Aqua Products, Inc., Cedar Grove, NJ (US)

( * ) Notice: Subject to any disclaimer, the term of this patent is extended or adjusted under 35 U.S.C. 154(b) by 0 days.

(21) Appl. No.: 15/848,432

(22) Filed: Dec. 20, 2017

(65) Prior Publication Data
US 2018/0127999 A1 May 10, 2018

Related U.S. Application Data (63) Continuation-in-part of application No. 15/344,249, filed on Nov. 4, 2016, now Pat. No. 9,902,477.

(51) Int. Cl.
*E04H 4/16* (2006.01)

(52) U.S. Cl.
CPC ......... *E04H 4/1654* (2013.01); *E04H 4/1636* (2013.01)

(58) Field of Classification Search
CPC ............................ E04H 4/1636; E04H 4/1654
See application file for complete search history.

(56) References Cited

U.S. PATENT DOCUMENTS

| | | |
|---|---|---|
| 1,172,456 A | 2/1916 | Hoadley |
| 3,908,776 A | 9/1975 | Dudley |
| 5,097,559 A | 3/1992 | Brunt et al. |
| 5,199,520 A | 4/1993 | Chen |
| 5,435,031 A | 7/1995 | Minami |
| 5,683,164 A | 11/1997 | Chien |
| 5,947,051 A * | 9/1999 | Geiger ................ B62D 57/00 114/222 |
| 6,548,982 B1 | 4/2003 | Papanikolopouls et al. |
| 6,802,237 B1 * | 10/2004 | Jones .................. B63G 7/02 102/402 |
| 6,883,201 B2 | 4/2005 | Jones et al. |

(Continued)

FOREIGN PATENT DOCUMENTS

| | | |
|---|---|---|
| DE | 102010017991 A1 | 10/2011 |
| DE | 102014017366 A1 | 5/2016 |

(Continued)

OTHER PUBLICATIONS

Extended European Search Report from the European Patent Office for Application No. 17200186.9-1002 dated Apr. 3, 2018.

*Primary Examiner* — Tyler J Lee
(74) *Attorney, Agent, or Firm* — Edell, Shapiro & Finnan, LLC (57) ABSTRACT

A drive module for submersible autonomous vehicles is disclosed. The drive module includes a propulsion element configured to engage and rotate against a surface, a motor configured to drive the propulsion element, and a controller configured to cause the motor to drive the propulsion element. The drive module also includes a housing configured to be removably, releasably coupled to the exterior of a submersible autonomous vehicle. The motor and the controller are disposed within the housing.

20 Claims, 8 Drawing Sheets

(56) References Cited

U.S. PATENT DOCUMENTS

| | | |
|---|---|---|
| 7,117,554 B2 | 10/2006 | Pichon |
| 7,448,113 B2 | 11/2008 | Jones et al. |
| 7,475,611 B2 | 1/2009 | Yang |
| 7,571,511 B2 | 8/2009 | Jones et al. |
| 7,636,982 B2 | 12/2009 | Jones et al. |
| 7,690,066 B2 | 4/2010 | Stoltz |
| 7,938,210 B2 | 5/2011 | Kunzler et al. |
| 8,096,378 B2 | 1/2012 | Xie |
| 8,201,649 B2 | 6/2012 | Andrus et al. |
| 8,220,096 B2 | 7/2012 | Hui |
| 8,273,183 B2 | 9/2012 | Erlich |
| 8,474,090 B2 | 7/2013 | Jones et al. |
| 8,516,651 B2 | 8/2013 | Jones et al. |
| 8,584,305 B2 | 11/2013 | Won et al. |
| 8,584,307 B2 | 11/2013 | Won et al. |
| 8,602,134 B2 | 12/2013 | Andrus et al. |
| 8,656,550 B2 | 2/2014 | Jones et al. |
| 8,671,507 B2 | 3/2014 | Jones et al. |
| 8,756,740 B2 | 6/2014 | Hui |
| 8,757,309 B2 | 6/2014 | Schmitt et al. |
| 8,763,199 B2 | 7/2014 | Jones et al. |
| 8,763,200 B2 | 7/2014 | Kim et al. |
| 8,807,254 B2 | 8/2014 | Manus |
| 9,004,200 B2 | 4/2015 | Ben-Tzvi et al. |
| 9,033,079 B2 | 5/2015 | Shin et al. |
| 9,038,233 B2 | 5/2015 | Jones et al. |
| 8,950,038 B2 | 9/2015 | Won et al. |
| 9,131,817 B2 | 9/2015 | Huang et al. |
| 9,167,946 B2 | 10/2015 | Jones et al. |
| 9,241,602 B2 | 1/2016 | Lee et al. |
| 9,282,867 B2 | 3/2016 | Williams et al. |
| 2001/0042645 A1 | 11/2001 | van den Berg |
| 2001/0042646 A1 | 11/2001 | van den Berg |
| 2001/0047902 A1 | 12/2001 | Berg |
| 2002/0011368 A1 | 1/2002 | van den Berg |
| 2003/0137268 A1 | 7/2003 | Papanikolopouls et al. |
| 2004/0021439 A1* | 2/2004 | Porat ............... E04H 4/1654 318/567 |
| 2006/0059637 A1* | 3/2006 | Fridman ............ E04H 4/1654 15/1.7 |
| 2008/0078039 A1* | 4/2008 | Katz ................. E04H 4/1654 15/1.7 |
| 2008/0250580 A1* | 10/2008 | Lavabre ............ E04H 4/1654 15/1.7 |
| 2008/0302586 A1 | 12/2008 | Yan |
| 2011/0297070 A1 | 12/2011 | Riggs |
| 2012/0181099 A1 | 7/2012 | Moon et al. |
| 2013/0055521 A1 | 3/2013 | Lee et al. |
| 2013/0056026 A1 | 3/2013 | Jung |
| 2014/0031977 A1 | 1/2014 | Goldenberg et al. |
| 2014/0250613 A1 | 9/2014 | Jones et al. |
| 2014/0352103 A1 | 12/2014 | Won et al. |
| 2015/0306764 A1 | 10/2015 | Goldenberg et al. |
| 2016/0015232 A1 | 1/2016 | Nakamura et al. |
| 2016/0145884 A1 | 5/2016 | Erlich et al. |
| 2016/0215476 A1 | 7/2016 | Walker |
| 2016/0257357 A1 | 9/2016 | Ben-Tzvi et al. |
| 2016/0259336 A1 | 9/2016 | Lee et al. |

FOREIGN PATENT DOCUMENTS

| | | |
|---|---|---|
| KR | 101622365 B1 | 5/2016 |
| WO | 0250389 A1 | 6/2002 |
| WO | 2005116371 A1 | 12/2005 |

\* cited by examiner

DRIVE MODULE FOR SUBMERSIBLE AUTONOMOUS VEHICLE

CROSS-REFERENCE TO RELATED APPLICATIONS

This application claims benefit to and is a continuation-in-part of U.S. patent application Ser. No. 15/344,249, filed Nov. 4, 2016, and entitled "Drive Module for Submersible Autonomous Vehicle," the disclosure of which is incorporated herein by reference in its entirety.

FIELD OF INVENTION

The present invention relates to the field of autonomous vehicles and, in particular, to a drive system or module for a submersible autonomous vehicle, and even more particularly, to an add-on drive system or module for a pool cleaning robot.

BACKGROUND

Autonomous vehicles are being introduced into an ever increasing number of facets of daily life in order to automate various tasks, such as cleaning a pool, cleaning an indoor space, and maintaining a lawn. Additionally or alternatively, autonomous vehicles (also referred to herein as robots) may be used for entertainment, law enforcement, and a wide range of other purposes. There are many types of autonomous vehicles; however, many of these autonomous vehicles, such as submersible autonomous vehicles (e.g., pool cleaners) only include one type or manner of propulsion at least because it is often not economically efficient to include a second type of propulsion (e.g., a second drive system).

For example, since pool cleaners often require a pump or suction system to clean a pool, it is often economically efficient (and efficient in terms of space and size) to utilize the pump system for both cleaning and propulsion (e.g., as opposed to including a dedicated/second drive system). As a more specific example, U.S. Pat. No. 8,273,183, incorporated herein by reference, discloses an autonomous pool cleaner with a water jet propulsion system that draws in water for both cleaning and propulsion. In order to utilize the drawn-in water to propel or move the pool cleaner along a surface, the pump system discharges the drawn-in water, as a pressurized stream, at an acute angle with respect to the surface. In the particular example of U.S. Pat. No. 8,273,183, the pressurized stream may be discharged in different directions to control steering of the submersible autonomous vehicle. Similarly, many indoor cleaning robots many only include two powered wheels. However, over time, these drive/propulsion systems will typically require maintenance, part replacement, or some other repair due to the wear and tear associated with repeated usage.

Unfortunately, since autonomous vehicles may be quite complicated and may be pre-assembled, maintenance frequently requires an end-user to transport the robot to a mechanic, manufacturer, or some other specialized technical service provider familiar with the drive system and/or the entire robot. Alternatively, an end-user may attempt to disassemble a robot and/or drive system with tools to try to assess and fix the problems on their own. However, often, an end-user can only disassemble a small portion of the robot (or a drive system) because the major components have been coupled together with specialized tools (e.g., tools machined or developed specifically for assembling/disassembling this particular robot). Moreover, even if the end-user can determine the problem, a part or portion of the drive system may be broken and, thus, may require a user to identify and order the correct replacement part. Consequently, regardless of how an end-user attempts to resolve a maintenance issue, an end-user will often be without a working drive system (and robot) for an extended period of time. Since autonomous vehicles are typically unable to function without a working drive system, this may render the autonomous vehicle useless for an extended period of time.

Moreover, as technology advances, new parts, programming, and configurations may be developed for robotic drive systems. These advancements may improve various aspects of the robots (e.g., battery technology, ability to navigate different terrains, surfaces, increased robot efficiency or power, etc.); however, most robots cannot be upgraded and, instead, must be replaced to obtain a technological upgrade. In fact, many robots cannot even be reconfigured and, thus, are only useful for certain, specific tasks (e.g., cleaning certain types or shapes of pools) and may require a user to buy different robots for different tasks. For example, many pool cleaning robots are provided by the manufacturer to the end-user in a compact, ready-to-use way, and the end-user is given little or no choice on how to configure of the robot. Then, if a user notices a problem with the drive system of the robot, the user has no options for adjusting the drive system to try to overcome the problem (and the user may also be unable to return or exchange the robot since the problems may only become apparent during extended, post purchase, use).

In view of at least the aforementioned issues, a self-contained drive module that can be removably attached to an autonomous vehicle as a replacement or supplemental drive system is desirable.

SUMMARY

The present invention relates to a drive system or module for an autonomous vehicle and, in particular, a submersible autonomous vehicle. The drive module includes a drive motor that drives a propulsion element (e.g., a wheel or wheels, or an endless track) to propel the robot along surfaces (lawn, carpet, flooring, pool surfaces, pool deck, etc.), whether above or below water (e.g., submerged). Consequently, the drive module is mechanically isolated from any mechanical systems (e.g., gear trains) included within the body of an autonomous vehicle to which the drive module is coupled (e.g., a "host" autonomous vehicle). In accordance with at least one embodiment of the present invention, the drive module is also electronically isolated, insofar as the drive module need not be operatively coupled (via a wired or wireless connection) to any systems included within the body of a robot. Instead, a self-contained drive module can simply be removably coupled to an autonomous vehicle and operate independently. Alternatively, a drive module may be operatively and/or electronically coupled to systems included within the body of a robot for specific requirements, such as to draw power from or supply power to electronic components included within the body of the robot, and/or to retrieve/receive/communicate control instructions to and from a control system included within the body of the robot (or electrically coupled to the robot).

The present invention avoids problems posed by known autonomous vehicles (e.g., maintenance and configuration issues) by providing a modular drive system that can be configured for many different autonomous vehicles. Consequently, if the drive system included on an autonomous vehicle malfunctions, requires maintenance, or is otherwise inadequate for some reason (e.g., obsolete battery technology), the drive module presented herein can be coupled to the autonomous vehicle to supplement or replace the drive system of the host autonomous vehicle. This minimizes the downtime of autonomous vehicles with broken drive systems while also maximizing the flexibility of a particular autonomous vehicle (e.g., to complete a wide variety of tasks).

Put another way, the drive module presented herein allows existing autonomous robots and, in particular, submersible robots, to be easily upgraded or reconfigured. As an example of an upgrade, the drive module may include the newest battery technology (e.g., smaller and/or more powerful batteries) and may be utilized to upgrade the battery life of an existing submersible, autonomous robot. The battery within the drive module could be a rechargeable battery that could, optionally, be removable from the module and could be recharged in a charging station via a contact-based charging system or a contactless charging system. At the same time, the drive module presented herein provides a drive system that can be easily maintained and/or fixed without removing an entire robot from service (e.g., a malfunctioning drive module of the present invention can simply be replaced with another drive module of the present invention).

As is described in further detail below, the drive module can be coupled to an autonomous vehicle with rapidly releasable coupling mechanisms, insofar as a rapidly releasable coupling mechanism includes any coupling that can be rapidly achieved without the use of any specialized tools (e.g., without any tools) and without any special skills or knowledge, such that a rapidly releasable coupling mechanism can be engaged or disengaged easily by an end-user. For example, a rapidly releasable coupling mechanism may include snap-fitting mechanisms, tongue and groove mechanisms, resilient mechanisms (e.g., detents, living hinges, etc.), half-turn or quarter turn latches and/or plug and socket mechanisms. Consequently, each drive module can be quickly and easily replaced by an end-user. In fact, in some embodiments, the components of the drive module presented herein may also be coupled together in a manner that allows each component to be individually removed from the drive module without removing or disassembling other components to simplify maintenance.

BRIEF DESCRIPTION OF THE DRAWINGS

To complete the description and in order to provide for a better understanding of the present invention, a set of drawings is provided. The drawings form an integral part of the description and illustrate an embodiment of the present invention, which should not be interpreted as restricting the scope of the invention, but just as an example of how the invention can be carried out. The drawings comprise the following figures.

DETAILED DESCRIPTION

The following description is not to be taken in a limiting sense but is given solely for the purpose of describing the broad principles of the invention. Embodiments of the invention will be described by way of example, with reference to the above-mentioned drawings showing elements and results according to the present invention.

Generally, the drive module presented herein includes a propulsion element, such as a wheel or endless track, and a motor configured to drive the propulsion element. In some embodiments, the motor may be coupled to the propulsion element via a gear train, power train, or other such components. Additionally, the drive module includes a controller that is operable to control the drive motor (e.g., to control speed and direction of a motor shaft). In some embodiments, the drive module also includes a second motor configured to engage and drive an internal system of an autonomous vehicle on which the drive module is attached (and, thus, the second motor may be referred to as an internal system motor or pump motor) and the controller may also be operable to control the second motor.

As is explained in further detail below, in some embodiments, the drive module may also alternately or concurrently include a communications module that allows the controller to communicate with a control system included in an autonomous vehicle to which the drive module is coupled (e.g., a host autonomous vehicle) and/or with other drive modules that are also coupled to the host autonomous vehicle. Consequently, a drive module may receive instructions (via a wired or wireless connection) from, send feedback or control instructions to, or otherwise communicate with the control systems or the other drive modules included on or within the body of a host robot (e.g., a submersible, pool cleaning robot). Additionally or alternatively, the drive module may include memory with drive instructions for controlling the drive motor.

Similarly, in some embodiments, the drive module may draw power from power systems of a host robot, but in other embodiments, the drive module may include an internal power source. In still further embodiments the drive module may draw power from a host robot and also include an internal power source. Regardless, the drive module may be configured to power a motor, controller, and any other powered components included in the drive module. Additionally or alternatively, the drive module may be configured to provide power to electronic systems included within the host autonomous vehicle. Consequently, if the drive module includes enhanced battery technology (as compared to battery technology included on the existing host autonomous vehicle), the drive module may provide longer battery life, enhanced power attributes, and any other such advantages afforded by the enhanced battery technology to the existing host autonomous vehicle. As mentioned above, the drive module's battery could be recharged in a charging station via a contact-based charging system or a contactless charging system.

The drive modules presented herein in accordance with the present invention may be individually coupleable to an autonomous vehicle with rapidly releasable coupling mechanisms, such as snap-fit mechanisms, or other similar mechanisms, such that each drive module can easily be removed from the main body (e.g., without disassembling other portions of the autonomous vehicle). Consequently, an end-user may easily remove a drive module for maintenance, replacement, or repair. Additionally, if a robot has a broken drive system, a user may simply install (or replace) a drive module onto the robot, instead of taking the robot out of service for an extended period of time for inconvenient and costly maintenance. One particular embodiment for individually, releasably coupling an exemplary drive module of the present invention to a host autonomous vehicle is described below in connection with FIGS. 4A-C; however, this is merely an example and any rapidly releasable coupling may be used to couple any embodiment of the drive module to a host autonomous vehicle.

In many known submersible autonomous vehicles, components of the autonomous vehicle's drive system are distributed throughout the autonomous vehicle. Consequently, the drive systems are not removable and are difficult to repair. Alternatively, some submersible autonomous vehicles include components of a drive system (e.g., a motor) disposed externally of a main body of the autonomous vehicle. However, these drive systems are often interconnected with systems included within the autonomous vehicle (e.g., external components are electrically connected to a power source disposed within the main body of the autonomous vehicle) and/or not removable, let alone easily removable, from the main body.

Easy removal and replacement facilitate a do-it-yourself (DIY) approach and/or workaround for maintenance and repairs, while also allowing an end-user to reconfigure or upgrade an autonomous vehicle, if desired. For example, an end-user may easily reconfigure an autonomous vehicle between different drive configurations, perhaps to add rear-wheel drive to a front-wheel drive autonomous vehicle (thereby creating a four-wheel drive vehicle) or to add traction propulsion to an autonomous vehicle (e.g., pool cleaner) with jet or fluid propulsion. As another example, the drive module could be used to provide the motive force for moving water around inside the submersible autonomous vehicle (for cleaning a pool, for example). In this example, a shaft extending outward from within the body of the submersible autonomous vehicle could be mated with the drive module where a bladed-member, like a fan blade, attached to the end of the shaft within the body of the vehicle can be driven by the motor within the external drive module. Thus, the body of the submersible autonomous vehicle need not include any internal motor or pump to operate. Put briefly, the drive module presented herein allows the end-user to design and configure an autonomous vehicle according to their needs, encouraging a DIY approach for improvement and reconfigurations.

Figure 1:
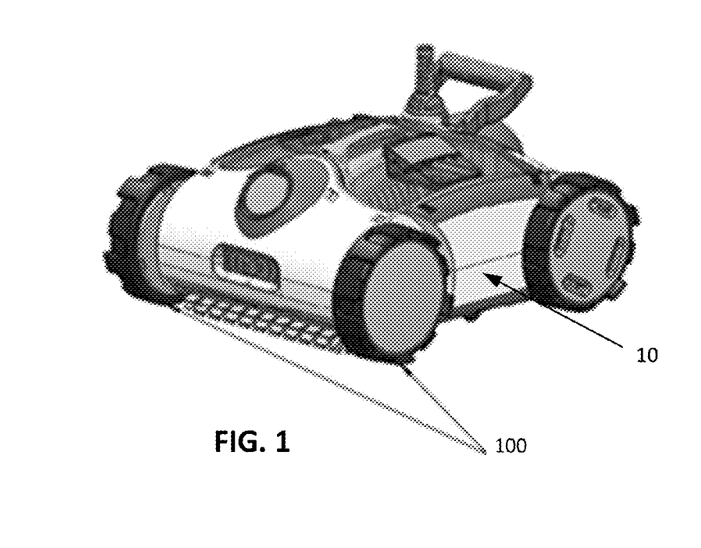
FIG. 1 is a front perspective view of an example autonomous swimming pool cleaner including at least one drive module configured in accordance with a first exemplary embodiment of the present invention.
Figure 2:
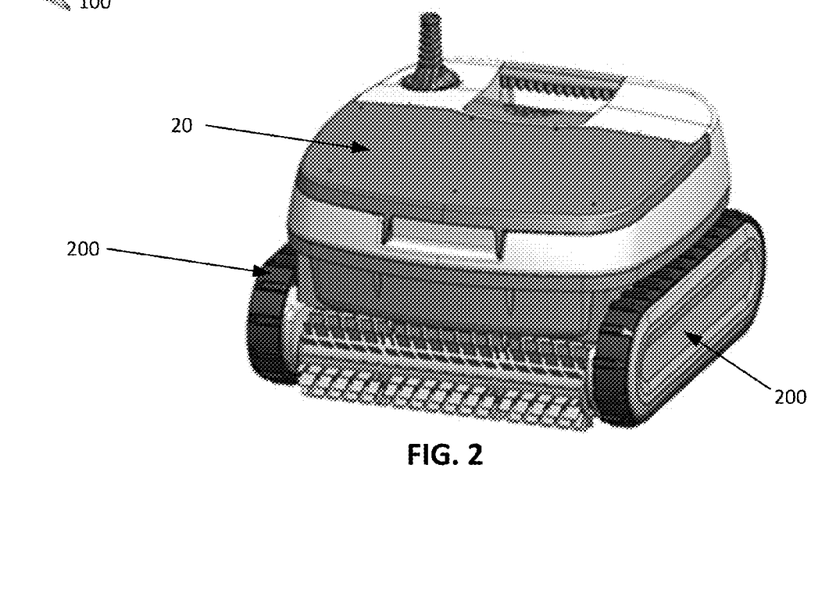
FIG. 2 is a front perspective view of another example autonomous swimming pool cleaner including at least one drive module configured in accordance with a second exemplary embodiment of the present invention.

Now referring to FIGS. 1 and 2 for a high-level description of two autonomous vehicles including exemplary drive modules in accordance with the present invention. FIG. 1 shows an autonomous pool cleaner 10 including a drive module 100, while FIG. 2 shows an autonomous pool cleaner 20 including a drive module 200. Although both of the depicted autonomous vehicles are submersible pool cleaners, it is to be understood that the drive modules described herein could also be installed on other types of autonomous vehicles configured to travel along a surface (e.g., ground-based autonomous vehicles), such as autonomous vacuums, autonomous lawn mowers, etc. Moreover, features incorporated in one embodiment (e.g., drive module 100) could easily be incorporated into another embodiment (e.g., drive module 200), or vice versa.

The particular pool cleaner 10 shown in FIG. 1 typically includes free-wheeling wheels and is driven (e.g., propelled) via water jets exiting the top of the pool cleaner at sharp angles. The free-wheeling wheels contact the inner surfaces of the pool (walls and floor) and roll thereon as the water jets propel the pool cleaner 10. However, in the illustrated embodiment, the two front wheels have been replaced with drive modules 100 configured as wheels in accordance with the present invention. The drive modules 100 are described in further detail below in connection with FIGS. 5-7, but, generally, the drive modules 100 add a second propulsion system to the pool cleaner 10 that can be operated together with the jet (fluid) propulsion system included in robot 10 or as an alternative to the jet (fluid) propulsion system. For example, the drive modules 100 may drive the robot 10 in portions of the pool where the jet propulsion system may struggle (e.g., certain corners and/or walls) and/or in situations where the jet propulsion system is malfunctioning (e.g., when the jet propulsion system is clogged). As is also described below in further detail, the drive modules 100 may receive power from, supply power to, and/or communicate with systems included in the robot 10 in order to work together and/or as an alternative to the jet propulsion system included in robot 10.

By comparison, the pool cleaner 20 shown in FIG. 2 is typically driven by endless tracks that receive power from a motor disposed within a main housing of the pool cleaner 20, but have been replaced with or supplemented by self-contained drive modules 200. The drive modules 200 are described in further detail below in connection with FIGS. 3 and 4A-C, but, generally, the drive modules 200 may include any components (e.g., a power source, motor, controller with drive instructions, etc.) needed to allow the drive modules 200 to propel the pool cleaning robot 20 without interacting with any components or systems included in the pool cleaning robot 20. For example, the drive modules 200 may include a complete power train housed therein and, thus, may be mechanically isolated from mechanical systems included in the pool cleaner 20. Despite the mechanical differences between drive module 100 and drive module 200, both drive modules may be sealed such that any electrical components, gears, or other components that might be negatively impacted by exposure to water, are protected when the robots 10, 20 are submerged under water.

Moreover, both drive modules may include a power source and necessary program instructions to operate a power train and propulsion element included therein, if desired. For example, the drive module 200 may include an internal power source and program instructions stored in memory, so that the drive module may also be operatively and electronically isolated from systems included in the pool robot 20. However, despite these capabilities, in some embodiments, the drive modules may be operatively and/or electronically coupled to systems of a host submersible robot. For example, the drive module 200 may be electronically coupled to a power system within the body of the robot 20 in order to receive power from the robot 20 and/or the drive module 200 may be operatively coupled to a control system within the body of the robot 20 in order to receive drive instructions from the control system. Moreover, these connections may allow a drive module (e.g., drive module 200) to supply power and/or control instructions to systems included within a host autonomous robot (e.g., a submersible pool cleaner without on-board intelligence), possibly allowing the autonomous robot to be detached from a tether or cord that attaches the cleaner to an external source of power and/or instructions.

Figure 3:
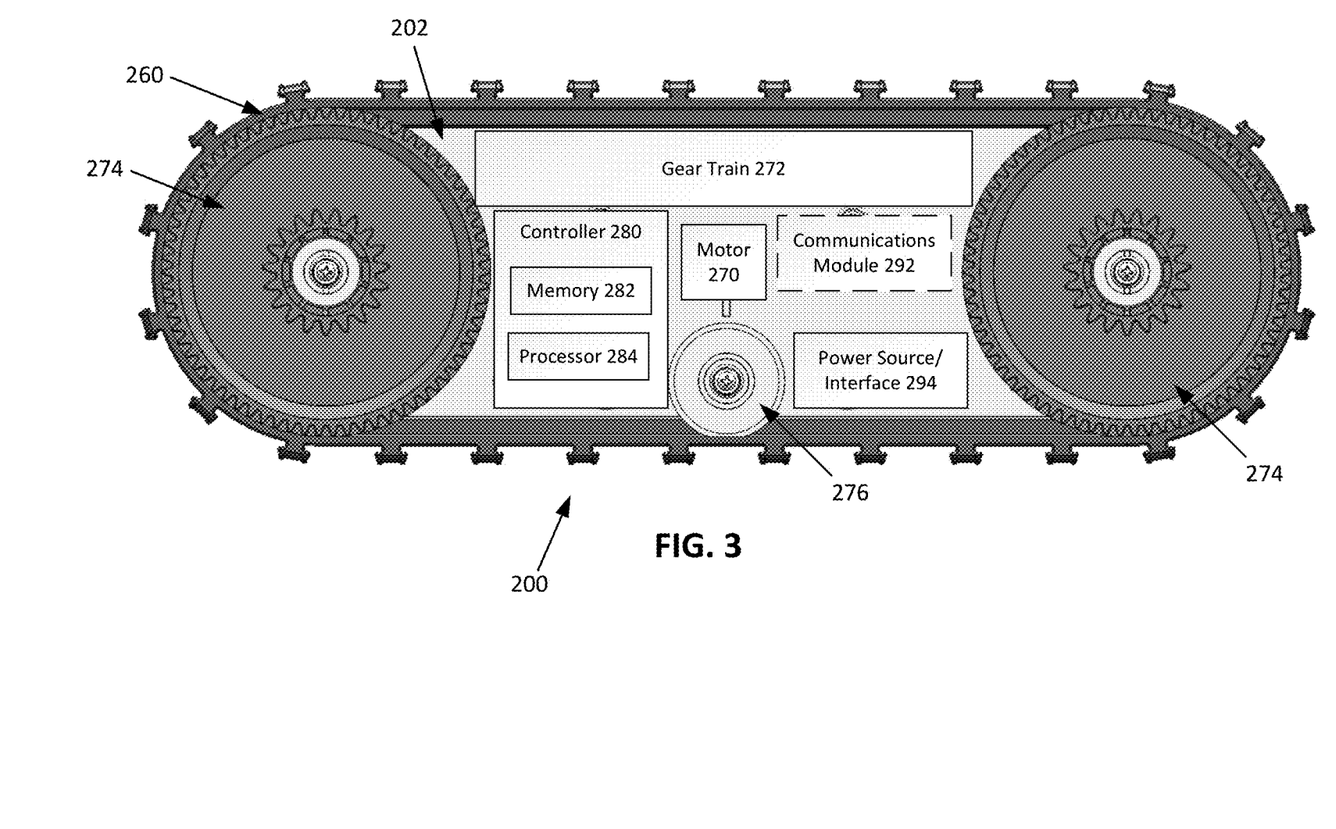
FIG. 3 is a side, sectional view of the drive module of FIG. 2.

FIG. 3 depicts the drive module 200 included in FIG. 2, according to an exemplary embodiment of the present invention. As mentioned above, the drive module 200 is a self-contained drive module 200 and, thus, includes a controller 280 that is configured to control a motor 270 to drive a propulsion element 260. For example, the controller 280 may control the rotational speed and rotational direction of a motor shaft for any desirable periods of time. The controller 280 and motor 270 are disposed within a housing 202 and the propulsion element 260 is disposed externally of the housing 202. In at least some embodiments, the housing comprises a water-tight enclosure and, thus, protects the controller 280, the motor 270, and any other components disposed therein from water exposure when the drive module 200 is utilized with a submersible robot.

In this particular embodiment, the propulsion element 260 is an endless track extending around the housing 202 and the drive module 200 includes a gear train 272 and drive gears 274 configured, through well-known mechanical coupling methods to impart motion from the motor 270 to the propulsion element 260 so that the propulsion element 260 engages and rotates against a surface to create a driving or propelling force. The drive module may also include a guide pulley 276 configured to stabilize the endless track 260. However, in other embodiments, the drive module 200 may include any elements or components to stabilize or support the propulsion element 260 and impart motion from the motor 270 to the propulsion element 260. Moreover, in other embodiments, the propulsion element 260 may be any element that may engage and provide motion along a surface. As an example, in some embodiments, the motor 270 may impart motion directly to a propulsion element 260 configured as a wheel that engages and rotates against a surface of a pool.

Regardless of the configuration of the motor 270 and propulsion element 260, the controller 280 is generally configured to control the motor 270 and, thus, is generally configured to control propulsion provided by the drive module 200. The controller 280 may include a memory 282 and a processor 284. While the figure shows a signal block 284 for a processor, it should be understood that the processor 284 may represent a plurality of processing cores, each of which can perform separate processing. Meanwhile, memory 282 may include random access memory (RAM) or other dynamic storage devices (e.g., dynamic RAM (DRAM), static RAM (SRAM), and synchronous DRAM (SD RAM)), for storing information and instructions to be executed by processor 284. The memory 282 may also include a read only memory (ROM) or other static storage device (e.g., programmable ROM (PROM), erasable PROM (EPROM), and electrically erasable PROM (EEPROM)) for storing static information and instructions for the processor 284. In addition, the memory 282 may be used for storing temporary variables or other intermediate information during the execution of instructions by the processor 284. Although not shown, in some embodiments, the controller may include a bus or other communication mechanism for communicating information between the processor 284 and memory 282

The controller 280 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The controller 280 performs a portion or all of the processing steps of the invention in response to the processor 284 executing one or more sequences of one or more instructions contained in a memory, such as memory 282. Such instructions may be read into memory 282 from another computer readable medium. One or more processors in a multi-processing arrangement may also be employed to execute the sequences of instructions contained in memory 282. In alternative embodiments, hard-wired circuitry may be used in place of or in combination with software instructions. Thus, embodiments are not limited to any specific combination of hardware circuitry and software.

Put another way, the controller 280 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, or any other medium from which a computer can read.

Embodiments presented herein include software stored on any one or any combination of non-transitory computer readable storage media, for controlling the controller 280, for driving a device or devices for implementing the invention, and for enabling the controller 280 to interact with a human user (e.g., an end-user). Such software may include, but is not limited to, device drivers, operating systems, development tools, and applications software. Such computer readable storage media further includes a computer program product for performing all or a portion (if processing is distributed) of the processing presented herein. The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

Still referring to FIG. 3, the drive module may also include a power source/interface 294 configured to supply power to the controller 280 and motor 270 and a communications module 292. As mentioned, in some embodiments, the drive module may be electronically and operatively isolated. In these embodiments, the drive module 200 may not need a communications module 292 and the power source 294 may be a battery or other such power source that is configured to supply power to the controller 280 and motor without receiving any continuous external power.

The communication module 292 may provide a two-way data communication coupling to a pre-existing controller within the body of the autonomous vehicle. Wireless links may also be implemented to communicatively couple the communication module 292 to a pre-existing controller within the body of the autonomous vehicle and/or an external source of instructions (e.g., external to the host autonomous vehicle, such as a base station). In any such implementation, the communication module 292 sends and receives electrical, electromagnetic or optical signals that carry digital data streams representing various types of information.

Generally, the communications module 292 may provide data communication through one or more networks to other data devices. For example, the communications module 292 of a first drive module may provide a connection to a communications module of a second drive module (e.g., in a master-slave configuration). Additionally or alternatively, as mentioned above, the communications module 292 may provide a connection to a pre-existing system included within the body of an autonomous vehicle, such as a control system. The connection may be through a "wired" communication channel or a wireless communication channel or protocol, such as BLUETOOTH®, or any other known form of wireless communication feasible between sealed modules operating underwater, such as optical communication, ultrasonic communication, and near-field communication. Even when utilized with a submersible robot, a wireless connection may provide sufficient connectivity between drive modules, a drive module and the host robot, etc., due to the proximity of these parts.

In embodiments where the drive module 200 is electronically or operatively coupled to an autonomous vehicle to which the drive module 200 is coupled (e.g. a host autonomous vehicle), the power source/interface may provide an electrical coupling to a power system within the body of the autonomous vehicle and the communications module 292 may operatively couple the drive module to systems included within the body of the autonomous vehicle to which the drive module 200 is coupled. Such coupling may be achieved via a tether wire which passes from the drive module 200 into the body of the autonomous vehicle. Moreover, such a coupling may allow the drive module 200 to supply power and/or send instructions to systems of the host autonomous vehicle. For example, if the host autonomous vehicle is a submersible pool cleaner that receives power and/or control instructions from an external source (e.g., a pool cleaner without any on-board instructions or power supply), the drive module 200 may replace or supplement the external source. Advantageously, this may increase the battery life of autonomous vehicle, allow for customized programming (e.g., by sending specific voltages and/or pulses, at specific times, to a comparator, encoder/decoder, application-specific integrated circuit (ASIC), etc. included in the host robot), and/or allow a submersible robot to be untethered from an external power source/controller.

Figure 4A:
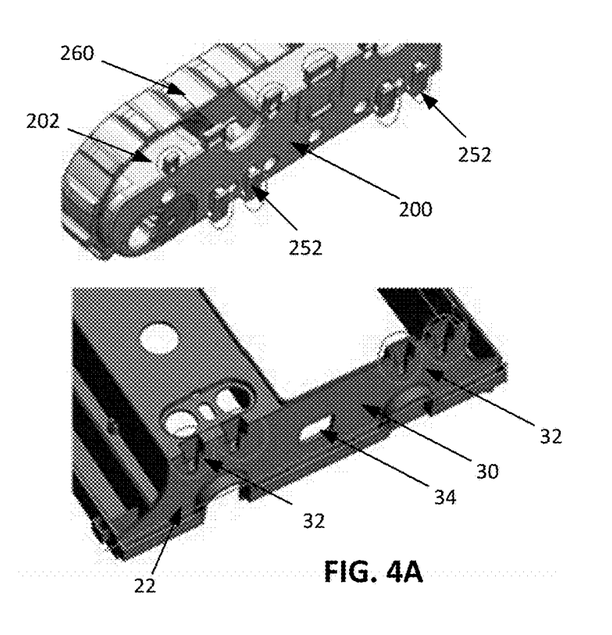
FIGS. 4A-C are side perspective views of a main body of the pool cleaner and the drive module of FIG. 2 and, collectively, FIGS. 4A-C schematically illustrate mounting the drive module on the main body, according to an exemplary embodiment of the present invention.
Figure 4B:
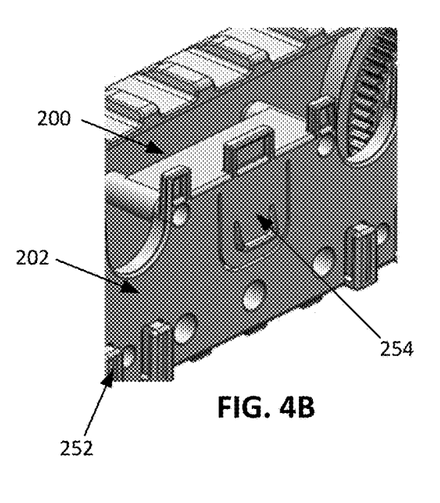
Figure 4C:
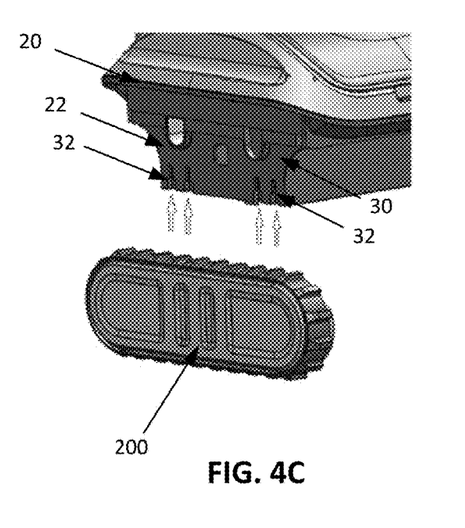

Now referring to FIGS. 4A-C for a description of how a drive module 200 of the present invention may be rapidly releasably coupled to an autonomous robot. In FIGS. 4A-C the drive module 200 is illustrated being coupled to a main body 22 of the robot 20; however, it is to be understood that this is merely one example of a rapidly releasable attachment and, in other embodiments, any drive module of the present invention may be rapidly releasably attached to an autonomous vehicle in any rapidly releasable manner so that other parts or assemblies included in the autonomous vehicle need not be disassembled or rearranged (e.g. drive module 100 may be slid onto an axle and secured thereon with a releasable clamping mechanism). Consequently, if a drive module requires maintenance, repair, or replacement, the drive module can be easily removed and fixed by an end-user. Additionally, although not shown in FIGS. 4A-C, connecting a drive module of the present invention to an autonomous vehicle may also involve electronically or electromagnetically coupling the drive module to the autonomous vehicle.

In the particular embodiment depicted in FIGS. 4A-C, a drive module 200 is coupled to a main body 22 of the pool cleaner 20 by engaging the drive module 200 with couplers 32 and an opening 34 included on a side 30 of the main body 22. In order to engage the couplers 32, the drive module 200 includes clasps 252 configured to slide vertically into slots created by the couplers 32. In this particular embodiment, each drive module 200 includes four clasps 252, arranged in two pairs (to match the arrangement of couplers 32 included on the main body 22 of the pool cleaner 20); but in other embodiments any desirable arrangement may be utilized.

Once the clasps 252 have been inserted into the couplers 32, as is illustrated in FIGS. 4A and 4C (with FIG. 4A illustrating a portion of the main body 22 upside down and not properly aligned with the drive module 200, for illustrative purposes), the drive module 200 may be pressed against the main body to engage a detent 254 with the opening 34 and create a snap engagement between the drive module 200 and the main body 22. Thus, the clasps 252 and couplers 32 may secure the drive module 200 to the main body 22 with respect to two directions (e.g., the x-direction and the z-direction) and the detent 254 and opening 34 may secure the drive module 200 to the main body 22 with respect to a third direction (e.g., vertically, or with respect to the y-axis). Since the detent 254 only resists a certain amount of force, the drive modules 200 may be detached from the main body 22 by pulling the drive module 200 laterally away from the main body 22 with a sufficient force to disengage the detent 254 from the opening 34. Then, the drive module 200 may be slid downwards (or upwards if the pool cleaner 20 is upside down) by the end-user to remove the clasps 252 from the couplers 32 and rapidly decouple the drive module 200 from the main body 22 (without tools).

In the particular embodiment depicted in FIGS. 4A-C, one drive module 200 is shown being installed onto a first side 30 of a main body 22 of the pool cleaner 20, but it is to be understood that a second drive module 200 may be installed on a second side of the main body 22 in a similar manner. In fact, in some embodiments, the drive module may be symmetrical so that the drive module 200 can be installed on either side of an autonomous vehicle, such as pool cleaner 20. For example, in the depicted embodiment, the detent 254 may be substantially centered on the drive module 200 and features included on the drive assembly 400 may be mirrored about the detent 254.

That being said, in other embodiments, the detent 254 could be provided on the main body 22 and an opening equivalent to openings 34 could be included on the drive module 200. Similarly, in other embodiments, the clasps 252 could be included on the main body 22 and the drive module 200 could include openings/couplers configured to receive the clasps. Still further, in other embodiments, the drive modules 200 may not include any clasps or detents and may be coupled to any portion of an autonomous vehicle in any manner that allows for rapid, removable coupling, so that an end-user can quickly remove the drive module 200 from an autonomous vehicle without tools.

Figure 5:
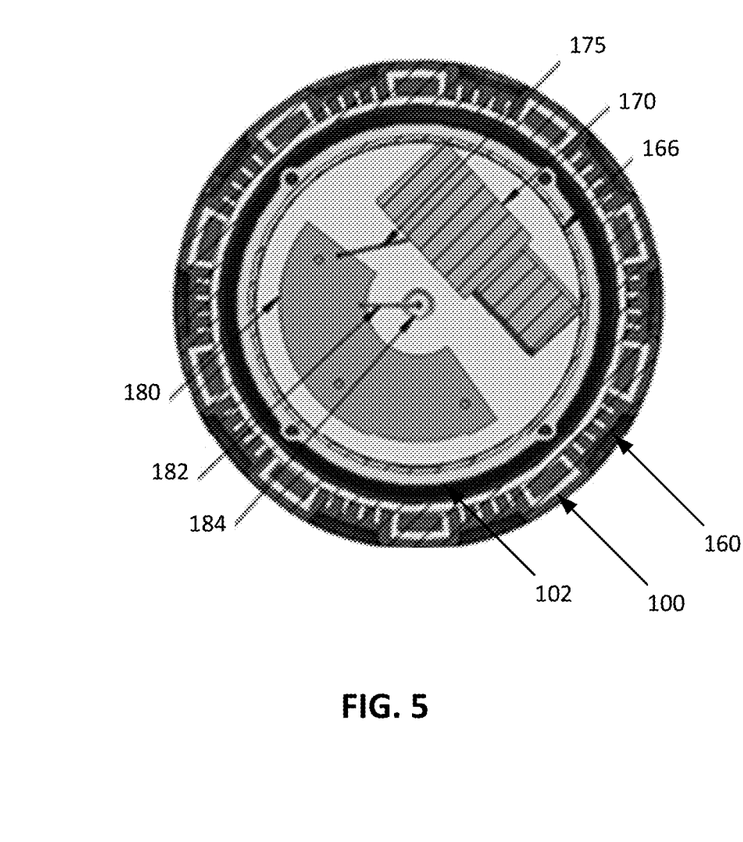
FIG. 5 is a side, sectional view of the drive module of FIG. 1.
Figure 6:
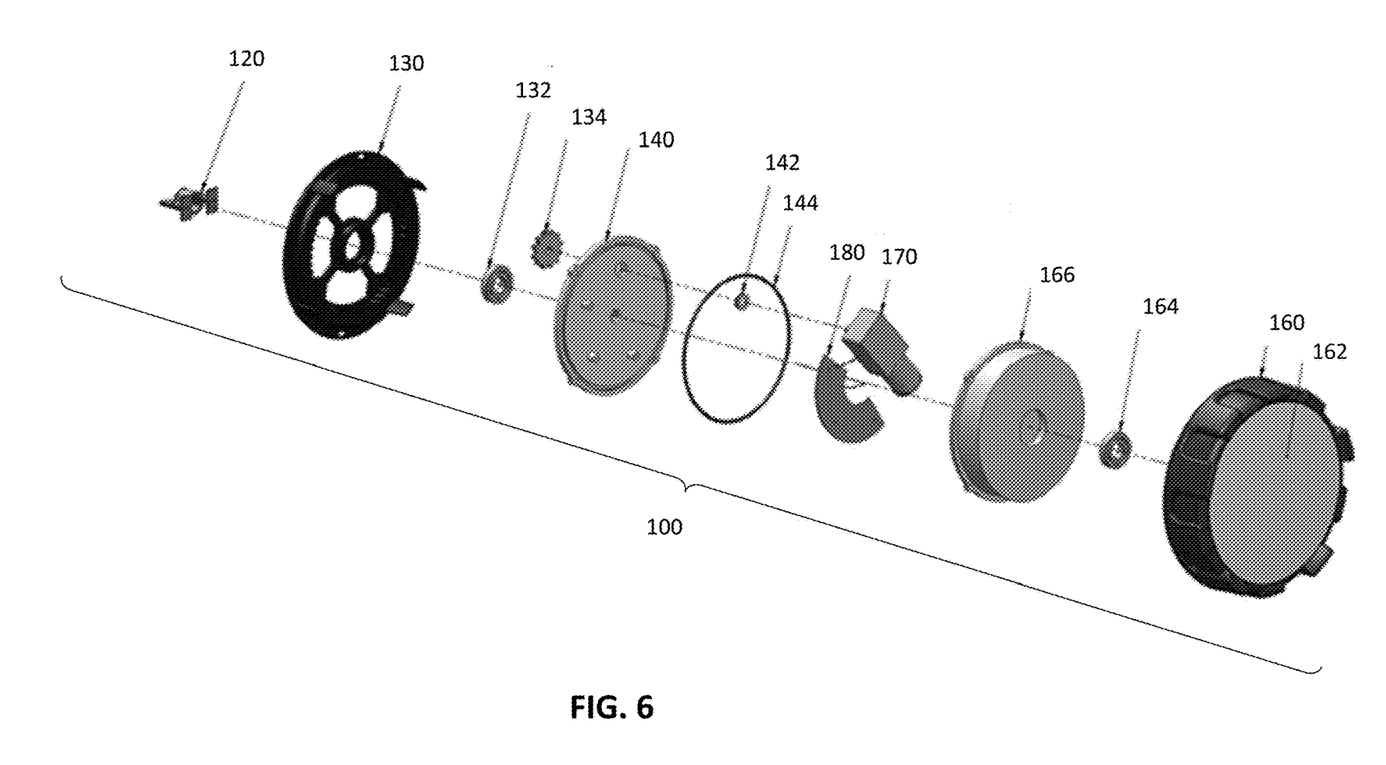
FIG. 6 is an exploded, side perspective view of the drive module of FIG. 1.
Figure 7:
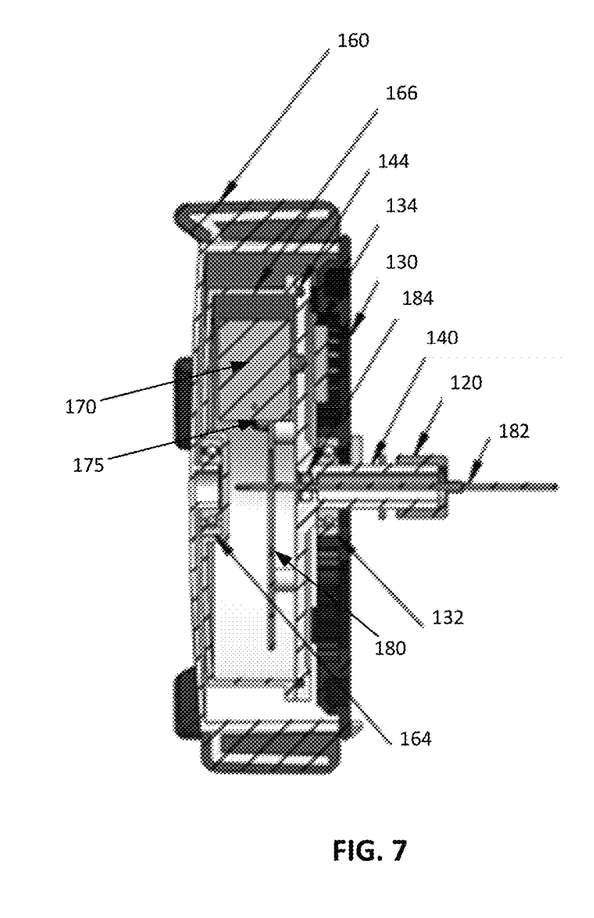
FIG. 7 is a front, sectional view of the drive module of FIG. 1.

Now referring to FIGS. 5-7, the drive module 100 illustrated in FIG. 1 is shown in further detail to explain another embodiment of the drive module presented herein. In this particular embodiment, the drive module 100 includes a controller 180, such as a printed circuit board (PCB), and motor 170 disposed within a housing 102. The controller 180 may be substantially similar to the controller 280 and, thus, any description of the controller 280 included above may also be applicable to controller 180. Thus, generally, controller 180 is configured to cause the motor 170 to drive a propulsion element 160 disposed externally of the housing 102.

In contrast with drive module 200, drive module 100 includes a propulsion element 160 that is a wheel 162 with a hub or rim (see FIG. 6) and the motor 170 is configured to drive the wheel 162 and hub. Also in contrast with drive module 200, drive module 100 is configured to be electronically and/or operatively coupled to the autonomous robot (e.g., robot 10) to which the drive module 100 is coupled. Consequently, as shown best in FIG. 5, the drive module 100 includes a cable 182 out to the robot. Controller 180 may receive instructions and power via cable 182 and may, in turn, transmit power and instructions to the motor 170 via cable 175.

In this particular embodiment, the drive module 100 is configured specifically for a submersible autonomous vehicle (e.g., a pool cleaner) and, thus, the controller 180 and motor 170 are sealed within the housing 102. In particular, the motor 170 and controller 180 are sealed between an enclosure top 166 and an enclosure base 140. In the depicted embodiment, the enclosure base 140 and enclosure top 166 are sealed together with a sealing ring 144 disposed therebetween. The enclosure base 140 and enclosure top 166 include openings to allow a motor shaft and axle to pass therethrough and these openings may be also be sealed, such as with sealing elements 142, 164, and/or 184. For example, element 142 may be a motor shaft v-seal while elements 132 and 164 are seals with ball bearings configured to receive an axle (with wired connections included therein) while epoxy seals 184 seal any exposed area in or around the axle and bearings 134 and 164.

The shaft of motor 170 extends externally of the housing 102 formed by the enclosure base 140 and enclosure top 166 and may engage and/or support a gear train that is configured to drive the propulsion element 160. Specifically, the motor 170 drives a motor gear 134 disposed outside of the housing 102 (e.g., on the opposite side of the enclosure base 140 from the motor 170). The motor gear 134 drives a wheel gear 130 configured to drive the propulsion element 160 (including wheel 162) about the motor 170 to create propulsion (thereby moving a pool cleaner to which the drive module 100 is coupled).

In some embodiments, the wheel gear 130 drives an axle (not shown), but in the depicted embodiment, the axle is rotationally fixed and the propulsion element 160 is driven about the fixed axle. Similarly, in some embodiments, the housing 102 (formed by enclosure top 166 and enclosure base 140) rotates with or within the propulsion element, but in the depicted embodiment, the housing 102 is fixed with respect to axle and propulsion element 160, thereby limiting the forces imparted on the controller 180 and motor 170 and preserving the longevity of these components. In fact, in the particular embodiment shown in the Figures, an axle clamp 120 fixes the housing 102 (including the motor 170 and controller 180) to a fixed axle and, thus, the housing 102 remains stationary while the propulsion element 160 rotates therearound. That being said, different axle configurations allow different drive configurations. For example, in at least some embodiments, a single motor can be used to drive multiple wheels disposed on the same axle. To facilitate some of these embodiments, the drive module 100 may be electrically coupled to a host robot via a swiveling electrical connection (e.g., when the entire drive module 100 rotates around an axle).

Figure 8:
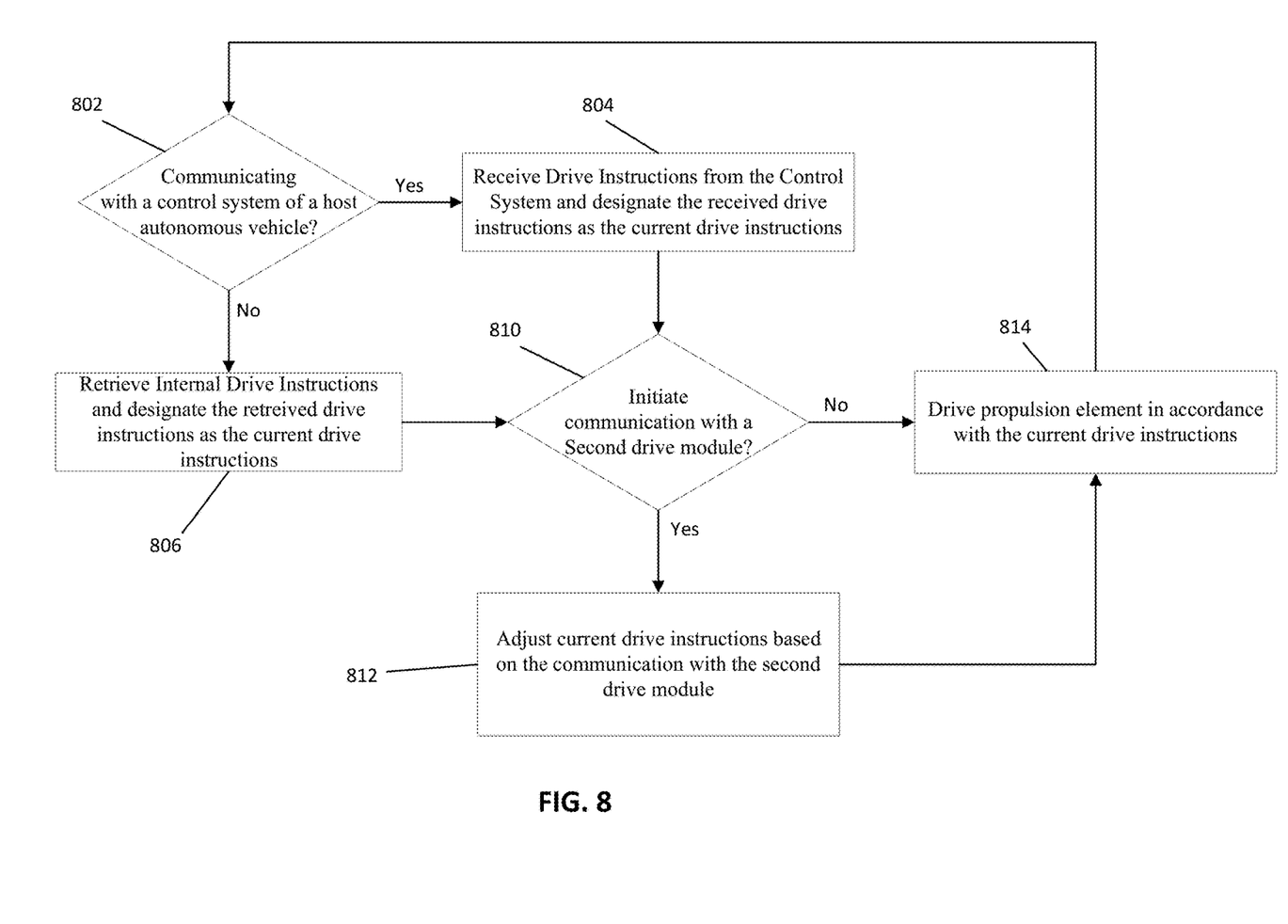
FIG. 8 is a flow chart illustrating operations of the drive module of FIG. 1 during propulsion of an autonomous vehicle.

FIG. 8 depicts a high level diagram of operations performed by a drive module (in accordance with the present invention) when the drive module is coupled to an autonomous vehicle. Initially, at step 802, a determination may be made (e.g., by the controller of the drive module) as to whether the drive module is in communication with a control system of a host autonomous vehicle, insofar as "host" simply denotes the autonomous vehicle to which the drive module is coupled. If the drive module is in communication with a control system of the host autonomous vehicle, the drive module may receive or retrieve drive instructions from the control system (e.g., the on-board computer) of the host autonomous vehicle and designate these instructions as the current drive instructions at step 804. As an example, when drive module 100 is coupled to an autonomous vehicle, a wired connection may be established between drive module 100 and the host autonomous vehicle and the drive module may retrieve or receive drive instructions.

By comparison, when the drive module 200 is coupled to an autonomous vehicle, the drive module 200 may not necessarily be in communication with control systems of the host autonomous vehicle (e.g., if a wireless connection cannot be established with the host autonomous vehicle). In instances where the drive module is not communicating with a control system of a host autonomous vehicle, the drive module may retrieve internal drive instructions (e.g., from memory) and designate the retrieved drive instructions as the current drive instructions at step 806.

At step 810, a determination is made (e.g., by the controller) as to whether the drive module is in communication with another drive module. If the drive module is not in communication with another drive module, the drive module may drive the propulsion element, at step 814, in accordance with the current drive instructions from step 804 or 806 (e.g., the controller may drive the motor in a certain speed or in a certain direction, thereby creating specific propulsion, via the propulsion element). Alternatively, if the drive module is in communication with a second drive module, the current drive instructions may be adjusted based on the communication, at step 812. For example, if an autonomous robot includes a first drive module disposed on the right side of the robot and a second drive module disposed on the left side of the robot, the two drive modules may communicate to coordinate movements and facilitate various driving patterns (e.g., in a master-slave configuration). Once the current drive instructions are adjusted (e.g., the drive module determines if it is a master or slave and responds appropriately), the propulsion element(s) may be driven accordingly at step 814. Then, the drive module may continue to check for further instructions by monitoring for new connections.

Figure 9:
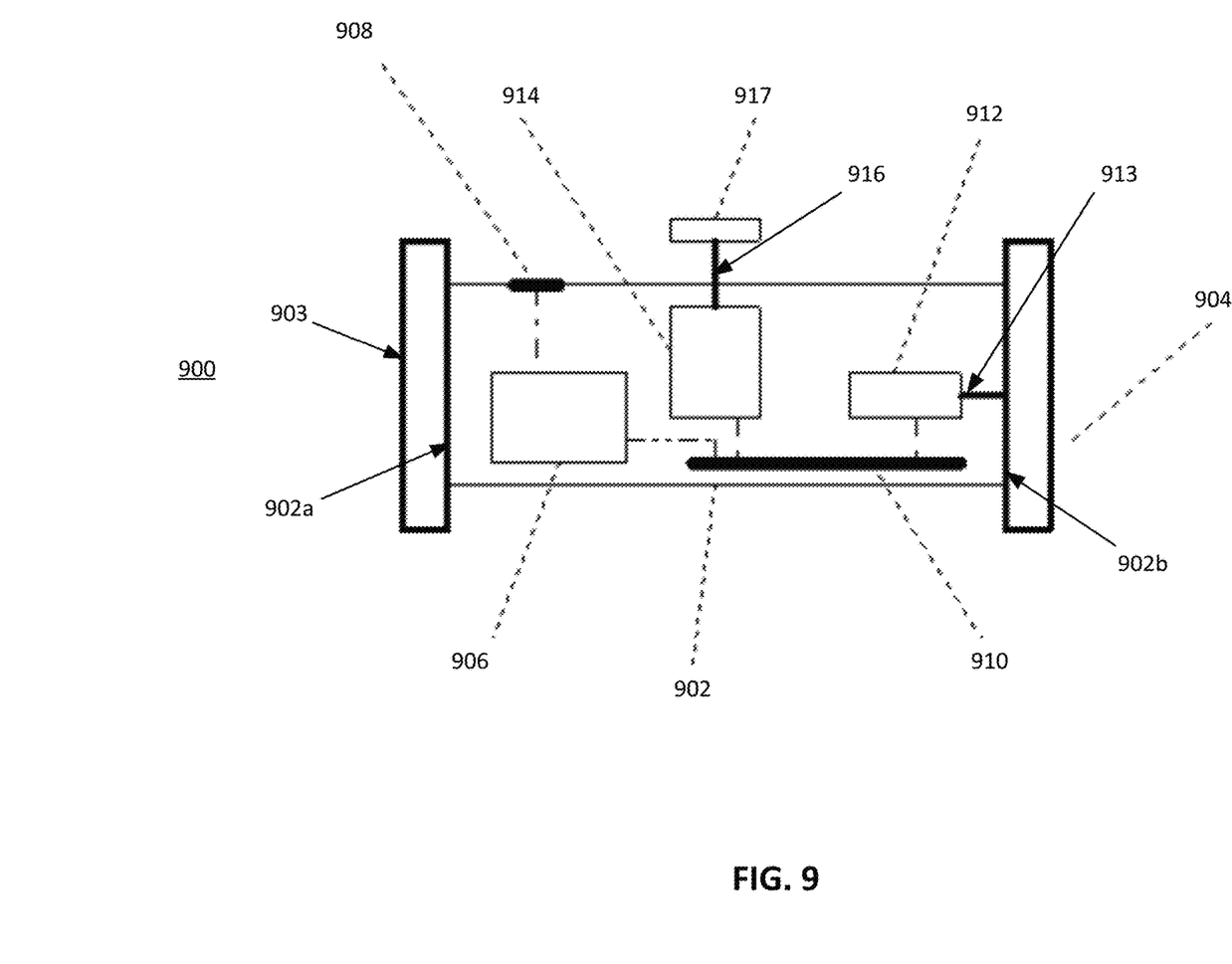
FIG. 9 is a top plan view of another embodiment of a drive module for an autonomous vehicle, such as the autonomous vehicle of FIG. 1 or FIG. 2.

Now turning to FIG. 9, in at least some embodiments, the drive module presented herein may provide propulsion elements on both sides of an autonomous, submersible vehicle. For example, the drive module may provide both front wheels, both back wheels, all four wheels, or any combination of wheels on both sides of the autonomous pool cleaner 10 depicted in FIG. 1. Alternatively, the drive module may provide both endless tracks included in the autonomous pool cleaner 20 depicted in FIG. 2. Still further, in some embodiments, the drive module may add additional propulsion elements to a pool cleaner (e.g., the drive module may add fifth and sixth wheels to the autonomous pool cleaner 10 depicted in FIG. 1). The drive module 900 depicted in FIG. 9 depicts one example drive module that provides propulsion elements on both sides of an autonomous, submersible vehicle.

In order to provide propulsion elements (e.g., wheels) on both sides of a host autonomous, submersible vehicle on which the drive module 900 is installed, the drive module 900 includes a housing 902 that extends from a first end 902a to a second end 902b. The first end 902a is configured to align with or extend beyond a first side of the host autonomous vehicle and the second end 902b is configured to align with or extend beyond a second side (opposite the first side) of the host autonomous vehicle. That is, the housing 902 spans the width of its host autonomous vehicle. As a more specific example, in some embodiments, the housing is cylindrical, and has a width dimension which approximates the width of the host autonomous submersible vehicle to which it is attached (e.g., the housing 902 may resemble the front of the autonomous submersible vehicle 10 depicted in FIG. 1). As another example, the housing 902 may be s substantially flat or slim plate that extends beneath a chassis (and spans the width of the chassis) of a host autonomous submersible, i.e., to provide endless tracks on either side of the chassis.

In the embodiment depicted in FIG. 9, a first propulsion element 903 is included on, attached to or otherwise coupled to the first end 902a of the housing 902 and a second propulsion element 904 is included on, attached to or otherwise coupled to the second end 902b of the housing 902. For example, the propulsion elements 903, 904 may be wheels attached to axles that extend through water impermeable seals included on the ends 902a, 902b of the housing 900. That being said, in some embodiments, at least one of the propulsion elements 903, 904 is free-wheeling (i.e., not driven) and need not extend through the housing 902. Instead, a free-wheeling propulsion element may be coupled to an exterior surface of the housing 902 without extending therethrough.

Moreover, and regardless of the shape of the housing 902, the housing 902 may be rapidly, releasably coupled to an autonomous robot (coupled without tools) with any desirable releasable couplings/attachments so that propulsion elements 903 and 904 are rapidly releasably coupleable to an autonomous robot. For example, the housing 902 may be coupled to a chassis of an autonomous, submersible vehicle with detents, clasps, and/or slots, similar to the rapid releasable attachment discussed in detail above in connection with FIGS. 4A-C, The housing 902 may be coupled to a front, back, bottom, or any other location of an autonomous, submersible vehicle.

The housing 902 also provides a waterproof compartment for a number of electrical or mechanical components, including a power source 906, a controller 910, a first motor 912, and a second motor 914, as well as any other components included in the drive module 900 (for example, the drive module 900 may also include memory and/or a communications module, similar to the memory 282 and communications module 292 depicted in FIG. 3 and described above). That is, the housing 902 defines a watertight or water impermeable internal compartment/receptacle that can receive or house any number of electrical or mechanical components.

Generally, the power source 906 and controller 910 are similar to the power source 294 and controller 280 depicted in FIG. 3. Consequently, the descriptions of power source 294 and controller 280 included herein are to be understood to apply to power source 906 and controller 910. However, now, the controller 910 is operable to control both motor 912 and motor 914. Meanwhile, the power source 906 may be a battery or other such power source that is configured to supply power to the controller 910 and any other components included in the drive module (e.g., motors 912 and 914) without receiving any continuous external power.

As was alluded to above (i.e. when describing power source/interface 294), in some embodiments, the power source 906 may intermittently receive power from an external power source. For example, the power source 906 may be charged from time to time. In FIG. 9, the power source is operably coupled to a waterproof interface 908 to facilitate charging. The waterproof interface 908 is disposed on the periphery of the housing 902 and configured to connect the power source 906 to an external power source for charging/recharging. Alternatively, a non-contact power transfer circuit, such as an inductive charging system, may be incorporated in the housing 902 to facilitate an electrical connection between the power source 906 and an external power source.

Still referring to FIG. 9, the first motor 912 may also be similar to the motor 270 depicted in FIG. 3 and, thus, any description of motor 270 may apply to first motor 912 (which may also be referred to as a first propulsion motor 912), insofar as first motor 912 may be configured to drive propulsion element 904 in the same manner that motor 270 is configured to drive propulsion element 260. On the other hand, the second motor 914 may only drive a propulsion element (e.g., propulsion element 903) in some embodiments and, thus, the description of motor 270 may only apply to the second motor 914 in some embodiments.

More specifically, in some embodiments the second motor 914 may be oriented such that a shaft 916 of the motor 914 extends in an opposite direction as compared to a shaft 913 of the first motor 912. The shaft 916 may also be parallel to or in line with shaft 913. In these embodiments, the second motor 914 may drive the first propulsion element 903 in the same manner that motor 270 drive a propulsion element 260 (as is described repeatedly herein). That is, the second motor 914 may be arranged so that the second motor 914 can drive the first propulsion element 903 based on instructions from the controller 910.

However, in other embodiments, such as the embodiment depicted in FIG. 9, the second motor 914 is configured to drive one or more internal systems or components included in the host autonomous vehicle (i.e., based on instructions from the controller 910). More specifically, the second motor 914 may be oriented such that shaft 916 is perpendicular to the shaft 913 (or rotational axis) of the first motor 912. That is, the second motor 914 may be positioned in the housing 902 so that the shaft 916 of the second motor 914 extends in a direction which is parallel to a longitudinal dimension (front-to-back dimension) of the submersible vehicle. The shaft 916 may exit the housing 902 via a water impermeable seal and, thus, may be suitable for transferring rotational energy from the drive module 900 to one or more internal systems of the host autonomous vehicle, such as a pump system of the autonomous vehicle.

More specifically, a distal end of shaft 916 (i.e., an end of the shaft 916 disposed outside the housing 902) may include a mechanical coupler 917 that may be configured to engage and drive an internal mechanical system of the host autonomous vehicle. The coupler 917 may be a mechanical clutch (like a dog clutch), a toothed wheel or gear, or any other mechanical coupler now known or developed hereafter. As one additional example, the coupler 917 may comprise specific shaping at the end of the shaft 916 that forms a key or mating surface, such as a D-shape. Regardless of its shape or configuration, the coupler 917 may connect, either directly or via a linkage (e.g., a gear train), to any internal system (and, more specifically, any mechanical system) of the host autonomous vehicle. In at least some of these embodiments, the drive module 900 remains electrically isolated from the autonomous vehicle (i.e., the connection provided by coupler 917 is purely mechanical) when coupled to an internal system of the host autonomous vehicle via coupler 917.

As a specific example, in some embodiments the coupler 917 may engage a gear train configured to drive a pump impeller. Consequently, once the drive module 900 is coupled to the host autonomous submersible vehicle and the second motor 914 drives shaft 916, the coupler 917 may causes the impeller to rotate (i.e., the motor 914 may drive the impeller) and create suction for drawing fluid and debris through the host autonomous, submersible vehicle for filtering. The fluid jet created by the impeller may also be employed to provide a fluid jet force for propulsion of the submersible vehicle.

Due to the foregoing features, drive module 900 may provide a single integrated unit (comprising a first motor (a drive motor), a propulsion element, a second motor (an impeller motor), and a power source), which may be removed from the autonomous, submersible vehicle as a single unit for maintenance, replacement, upgrades, and/or recharging. In fact, in some instances, when an autonomous, submersible vehicle needs maintenance, replacement, upgrades, and/or recharging, a majority of the autonomous, submersible vehicle may be left in a pool and only the drive module 900 may need to be removed from the pool In other words, drive module 900 may provide a compact operational hub for an autonomous vehicle that may be easier to transport, examine, etc. and, thus, may easier to repair, upgrade, service, etc. (at least as compared to pool cleaners that cannot be easily disassembled by an end user prior to maintenance or upgrade operations).

Still referring to FIG. 9, as mentioned, in some embodiments, the drive module 900 may include a communications module configured to establish at least one of a wired or wireless connection with the host submersible autonomous vehicle on which the drive module 900 is installed. In these embodiments, the controller 910 may be configured to communicate, via the communications module, with a control system for the submersible autonomous vehicle to retrieve drive instructions for the controller 910. For example, the controller 910 may operate in accordance with the operations described in connection with FIG. 8. In fact, in some embodiments, the drive module 900 may communicate with another drive module as is explained in connection with FIG. 8. For example, a first drive module 900 may be installed as front wheels of an autonomous vehicle, a second drive module 900 may be installed as back wheels of the autonomous vehicle and the two drive modules may communicate to drive the autonomous vehicle. In at least some embodiments all of these communications are wireless communications so that each drive module 900 is electrically isolated from other drive modules and the autonomous vehicle.

Similarly, in some embodiments, the controller 910 may be configured to communicate, via the communications module, with a control system for the submersible autonomous vehicle to retrieve internal system instructions for the controller 910. For example, the controller 910 may obtain cleaning instructions that indicate how to control a pump system in order to attempt to collect debris. Alternatively, the drive module may store internal system instructions, such as cleaning instructions, in memory included therein.

To summarize, in one form, a drive module for autonomous vehicles includes a propulsion element configured to engage and rotate against a surface, a motor configured to drive the propulsion element, and a controller configured to cause the motor to drive the propulsion element. The drive module also includes a housing configured to be removably, releasably coupled to an autonomous vehicle. The motor and the controller are disposed within the housing.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the drive module described herein, or portions thereof may be fabricated from any suitable material or combination of materials, such as plastic, foamed plastic, wood, cardboard, pressed paper, metal, supple natural or synthetic materials including, but not limited to, cotton, elastomers, polyester, plastic, rubber, derivatives thereof, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof.

Finally, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Similarly, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

The invention claimed is:

1. A self-contained drive module for attachment to a submersible autonomous vehicle, the drive module comprising:
 a propulsion element configured to engage and rotate against a surface;
 a first motor configured to drive the propulsion element;
 a second motor configured to drive an internal system of the submersible autonomous vehicle;
 a controller configured to cause the first motor to drive the propulsion element and the second motor to drive the internal system; and
 a housing configured to be removably coupled to the exterior of the submersible autonomous vehicle, wherein the first motor, the second motor, and the controller are disposed substantially within the housing.

2. The self-contained drive module of claim 1, further comprising:
 a power source configured to supply power to the controller and the motor.

3. The self-contained drive module of claim 2, wherein the drive module is electrically isolated from electrical components within the submersible autonomous vehicle.

4. The self-contained drive module of claim 2, further comprising:
 a waterproof interface that can be coupled to an external power source to charge the power source.

5. The self-contained drive module of claim 1, further comprising:
 a communications module configured to establish a wireless connection with a control system within the submersible autonomous vehicle.

6. The self-contained drive module of claim 5, wherein the controller is configured to communicate, via the communications module, with the control system within the submersible autonomous vehicle to retrieve drive instructions or internal system instructions for the controller.

7. The self-contained drive module of claim 1, wherein the propulsion element comprises at least one of a wheel and an endless tread.

8. The self-contained drive module of claim 1, wherein the controller comprises:
 at least one processor configured to:
  control the motor in accordance with drive instructions; and
  control the internal system based on internal system instructions.

9. The self-contained drive module of claim 8, wherein the controller further comprises:
 a memory storing the drive instructions and the internal system instructions, and the drive module is operatively isolated from control systems within the submersible autonomous vehicle.

10. The self-contained drive module of claim 1, wherein the internal system is a pump system.

11. The self-contained drive module of claim 1, wherein the submersible autonomous vehicle comprises a pool cleaner.

12. The self-contained drive module of claim 11, wherein the submersible pool cleaner includes a fluid propulsion drive system.

13. A submersible autonomous pool cleaner comprising:
 a main body including an exterior surface with a first side and a second side; and
 a drive module that is releasably coupled to the exterior surface of main body wherein the drive module extends from the first side to the second side when coupled to the main body and includes a propulsion element, a motor configured to drive the propulsion element, and a controller configured to cause the motor to drive the propulsion element.

14. The submersible autonomous pool cleaner of claim 13, wherein the propulsion element is a first propulsion element disposed on the first side of the exterior surface and the drive module further comprises:
 a second propulsion element disposed on the second side of the exterior surface.

15. The submersible autonomous pool cleaner of claim 14, wherein the motor is a first motor and the drive module further comprises:
 a second motor configured to drive the second propulsion element, the controller being further configured to cause the second motor to drive the second propulsion element.

16. The submersible autonomous pool cleaner of claim 13, wherein the motor is a first motor and the drive module further comprises:
 a second motor configured to drive an internal system of the submersible autonomous pool cleaner.

17. The submersible autonomous pool cleaner of claim 16, wherein the first motor, the second motor, and the controller are sealed within a watertight portion of a housing of the drive module and a motor shaft extends out of a sealed opening in the watertight portion of the drive module housing to connect the second motor to the internal system.

18. The submersible autonomous pool cleaner of claim 17, wherein the motor shaft is a first motor shaft, the sealed opening is a first sealed opening, and a second motor shaft extends out of a second sealed opening in the watertight portion of the drive module housing to connect the first motor to the propulsion element.

19. The submersible autonomous pool cleaner of claim 18, wherein the first motor shaft is perpendicular to the second motor shaft.

20. The submersible autonomous pool cleaner of claim 13, wherein the drive module further comprises:
 a power source configured to deliver the power to the controller and the motor.

* * * * *